UNITED STATES PATENT OFFICE.

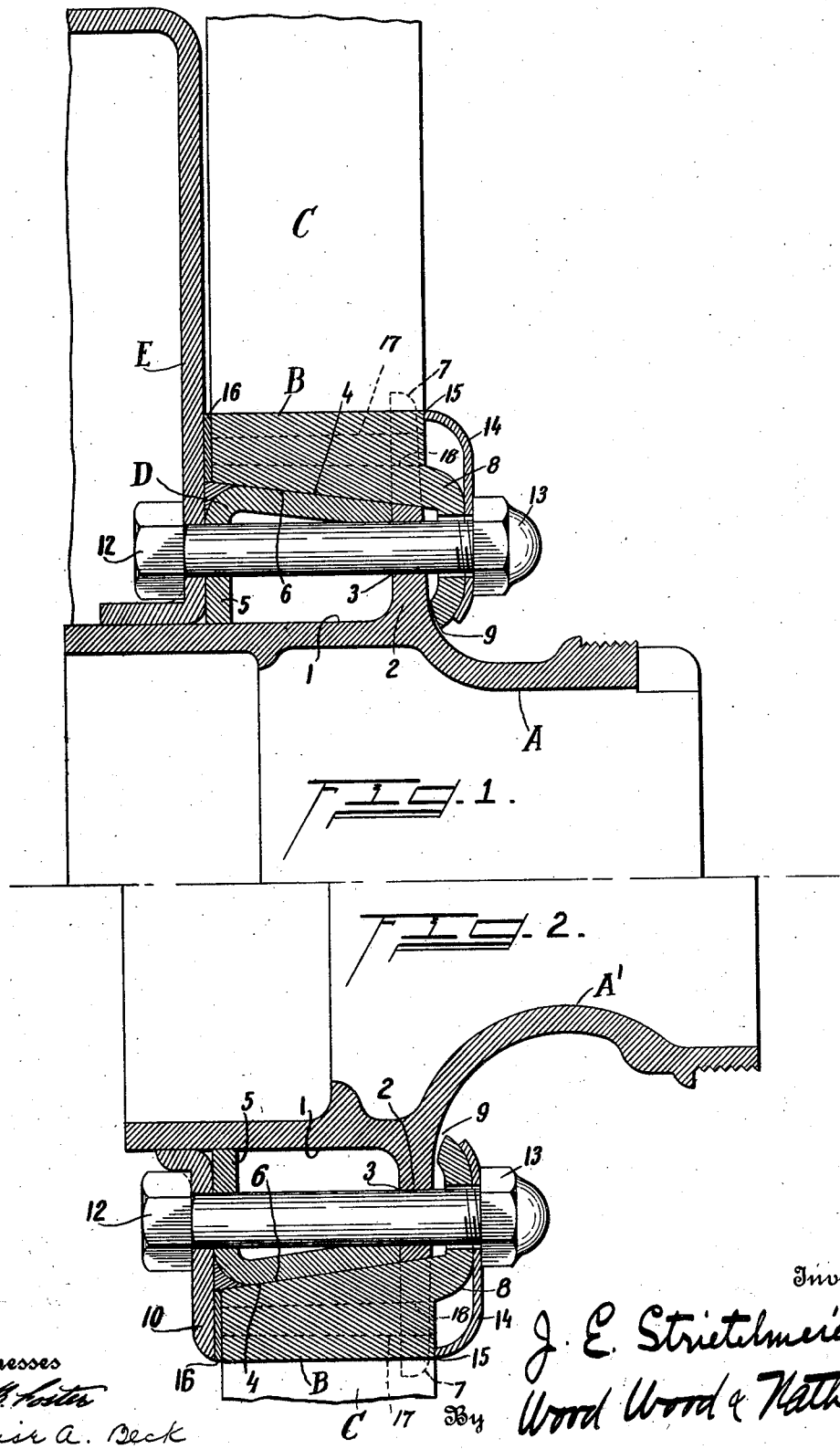

JOHN E. STRIETELMEIER, OF CINCINNATI, OHIO, ASSIGNOR TO THE IDEAL WHEEL COMPANY, OF CINCINNATI, OHIO, A CORPORATION OF OHIO.

DEMOUNTABLE SUBSTITUTION-HUB.

1,217,362.  Specification of Letters Patent.  Patented Feb. 27, 1917.

Application filed May 31, 1913. Serial No. 770,953.

*To all whom it may concern:*

Be it known that I, JOHN E. STRIETELMEIER, a citizen of the United States, and residing at Cincinnati, in the county of Hamilton and State of Ohio, have invented a new and Improved Demountable Substitution-Hub, of which the following specification is a full disclosure.

This invention relates to wheels and it is more especially concerned with a structure whereby concentional non-demountable wooden wheels may be converted at the least possible expense into an other wheel not only possessing the capacity of demountability but also providing improvements in the organization of the hub, spokes and rim.

An object of primary importance is to create a substitution wheel unit consisting of a false or slip-on hub, spokes and rim, all forming a unitary structure, together with certain auxiliary parts whereby the user of a standard wooden wheel may be enabled at very little expense to apply the substitution unit to his standard hub in lieu of the wooden spokes in such a way that a demountable wheel organization will be obtained.

Another object is to devise and render available a wheel unit readily applicable to that type of standard hub in which a flange integrally extends between the wooden spokes and the outer end of the hub.

Other objects will be in part obvious from the annexed drawings and in part indicated in connection therewith by the following analysis of this invention.

This invention accordingly consists in the features of construction, combination of parts, and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawing, like characters of reference denote corresponding parts throughout all the views, of which:—

Figure 1 is a radial section through the axis of the rear wheel of an automobile, showing the features of this invention and their relation to the brake-drum of such wheel.

Fig. 2 is a similar section taken through a front wheel of an automobile showing a slight rearrangement of the elements.

Continuing now by way of a more detailed description, A indicates a standard rear hub construction and A' indicates a standard front hub construction, both of which provide seats 1 upon which the inner ends of the wooden spokes normally rest. Between such seats and the outer or cap end of the hub is a flange 2 extending in a radial direction and provided with bolt-holes 3 through which pass the bolts that retain the wooden spokes against the hub flange. The wooden spokes are not illustrated since they are removed and their place is taken by the elements now to be described.

A slip on hub B carries the spokes C, which are preferably constructed and secured to the hub and rim respectively in the manner set forth in one or the other of my copending applications Serial Nos. 776,981, filed July 2, 1913, and 765,095, filed May 2, 1913. Thus, the spokes C are constructed of sheet metal terminating at their hub ends in elongated enlarged ends having a taper-pin-form with its larger end near the outer end of the hub, as indicated by the converging dotted lines 17 and 18 on Figs. 1 and 2. The hub member is slotted to admit the flat portions of the spokes.

This substitution hub B is in this instance constructed with an outwardly converging conical inner periphery 4 which seats upon an annular insert D having a corresponding peripheral seat 6 and an inturned end flange 5, the inner edge of which bears upon the seat 1 of the standard hub. Preferably the outer annular portion 7 of the flange 2 indicated by dotted lines is cut away to provide a greater length of the spokes C. Extending inwardly from the outer end of the hub B is an annular flange or lug 8 which preferably conforms closely to but clears the outer side of the flange 2, as indicated by 9. This flange 8, the hub flange 2, the insert flange 5 and the brake-drum E or the backing plate 10 are all provided with alining apertures, and through these passes a bolt 12 having a detachable nut 13 at its outer end, so that by screwing up the nut 13 all of the aforesaid parts will be clamped together. A retainer 14 of annular shape may also be provided so that its edge 15 may bear against the side of the substitution hub B and prevent lateral displacement of the spoke thereon, and a washer 16 may be used to prevent movement in the opposite direction of said spokes.

It will thus be seen that this invention is well-adapted to achieve the objects and advantages aforesaid and that the same not only forms an easily demountable wheel but enables any type of wheel structure to be applied to a standard hub of the nature shown.

Without further elaboration, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus revealed this invention, I claim as new and desire to secure by Letters Patent:—

1. A demountable wheel structure combining a hub having an outwardly extending annular flange provided with an aperture, an annular member of L-shaped section seated on said hub at the inner side of said flange, an annular spoke-mounting element circumscribing said member and said flange and having an apertured portion extending at the outer side of said flange and providing an aperture registering with the aperture of the latter, and means for drawing said parts together in clamping relation.

2. A demountable wheel structure combining a hub having an outwardly extending annular flange, an annular member seated on said hub and located at the inner side of said flange and having its periphery diverging to form a tapered seat having its smaller end adjacent the periphery of said flange, an annular spoke-mounting element circumscribing said member and having a taper fit therewith, and means for clamping said parts together.

3. A demountable wheel structure combining a hub having an outwardly extending annular flange, an annular member seated on said hub and located at the inner side of said flange and having its periphery diverging to form a tapered seat having its smaller end adjacent the periphery of said flange, an annular spoke-mounting element circumscribing said member and having a part extending at the outer face of said flange, and means engaging said part adapted to draw the same toward said flange to force said element in tight fitting relation with said member.

4. A demountable wheel structure combining a hub having an outwardly extending annular flange provided with an aperture and having a peripheral seat at the inner side of said flange, an annular member of L-shaped section having the edge of one of its legs resting on said seat at a distance from said flange and having its other leg resting endwise against the inner periphery of said flange, the periphery of said last-mentioned leg being tapered, an annular spoke-mounting element circumscribing said member and having a taper fit therewith and having an apertured portion extending inwardly at the outer side of said flange, and means coacting with said portion for drawing said parts together in clamping relation.

5. A demountable wheel structure combining a hub having an outwardly extending annular flange provided with an aperture and having a peripheral seat at the inner side of said flange, an annular member of L-shaped section having the edge of one of its legs resting on said seat at a distance from said flange and having its other leg resting endwise against the inner periphery of said flange, the periphery of said last-mentioned leg being tapered, an annular spoke-mounting element circumscribing said member and having a taper fit therewith and having an apertured portion extending inwardly at the outer side of said flange, and a draw-bolt having one end restrained against movement by said member and having its other end extending through said apertures and terminating in a nut engaging said portion to draw said parts together.

6. A wheel of the nature disclosed combining an annular hub-member having a taper bore, a plurality of spokes detachably secured to said hub-member and radiating therefrom, an inner hub-member having a tapered periphery, and means for detachably maintaining said hub-members in interfitting relation and simultaneously detachably securing said spokes to said hub-member.

7. A wheel of the nature disclosed combining an inner hub-member having an annular flange, an outer hub-member having a portion circumscribing said flange and having a part extending at the outer side thereof, a series of sheet metal spokes radiating from said outer hub-member, and means extending through said flange and coöperating with said part to maintain said hub-members in interfitting relation.

8. A wheel of the nature disclosed combining an inner hub-member having an annular flange, an outer hub-member having a portion circumscribing said flange and having a part located at the outer side thereof, a bolt extending in an axial direction through said flange and attached to said part to draw it toward said flange, and spokes radiating from said outer hub-member.

9. A wheel of the nature disclosed combining an inner hub-member having an annular flange, an outer hub-member having a portion circumscribing said flange and having a part located at the outer side thereof, said flanges and portion having a taper fit, a bolt extending in an axial direction through said flange and attached to said part to draw it toward said flange, and spokes radiating from said outer hub-member.

10. A wheel of the nature disclosed combining a hub having a radial annular flange intermediate its ends, a spoke-retaining member having a portion disposed at the outer side of said flange and having a portion projecting over the circumscribing edge of said flange, a series of spokes retained by said member, an annular part at the opposite side of said flange, and adjustable means for urging said part and said member toward each other.

11. A wheel of the nature disclosed combining a hub having a radial annular flange, a spoke-retaining member having a portion disposed at one side of said flange and having a spoke-retaining portion having an annular shape projecting over the circumscribing edge of said flange, a series of spokes retained by said member, and all located at one side of said flange and extending over into the plane of said flange, and adjustable means for urging said member in an axial direction.

12. A wheel of the nature disclosed combining a hub having a radial annular flange, a series of spokes disposed edgewise to the plane of the wheel and extending edgewise into the plane of said flange, a spoke-retaining member having an annular portion projecting over the edge of said flange and having a conical under-surface enlarging away from the outer end of the hub, and a bolt projecting in an axial direction and extending from said flange into engagement with said spoke-retaining member to move the same in an axial direction from the outer end of said hub.

In witness whereof, I hereunto subscribe my name, as attested by the two subscribing witnesses.

JOHN E. STRIETELMEIER.

Witnesses:
ALBERT F. NATHAN,
CLARENCE B. FOSTER.